(12) United States Patent
Shields et al.

(10) Patent No.: US 12,215,812 B2
(45) Date of Patent: Feb. 4, 2025

(54) PUSH-TO-CONNECT FITTING SYSTEMS AND METHODS

(71) Applicant: Tyco Fire Products LP, Lansdale, PA (US)

(72) Inventors: Steven L. Shields, Lubbock, TX (US); Lyle J. Miller, Milford, CT (US); Kevin Wade Pressnell, Athens, AL (US); Josh Keeling, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/006,789

(22) PCT Filed: Oct. 8, 2021

(86) PCT No.: PCT/IB2021/059259
§ 371 (c)(1),
(2) Date: Jan. 25, 2023

(87) PCT Pub. No.: WO2022/079563
PCT Pub. Date: Apr. 21, 2022

(65) Prior Publication Data
US 2023/0265953 A1 Aug. 24, 2023

Related U.S. Application Data

(60) Provisional application No. 63/090,815, filed on Oct. 13, 2020.

(51) Int. Cl.
*F16L 37/091* (2006.01)
(52) U.S. Cl.
CPC ................. *F16L 37/091* (2013.01)

(58) Field of Classification Search
CPC .................................. F16L 37/091
See application file for complete search history.

(56) References Cited

U.S. PATENT DOCUMENTS 4,911,406 A * 3/1990 Attwood ............... F16L 37/091
251/148
9,086,179 B1 * 7/2015 Komolrochanaporn ..................
F16L 37/091

(Continued)

FOREIGN PATENT DOCUMENTS

DE 102011121088 A1 * 6/2013 ............ F16L 19/086
DE 10 2018 121 440 A1 3/2020

(Continued)

OTHER PUBLICATIONS

Korean Intellectual Property Office as International Searching Authority; International Search Report and Written Opinion; International Patent Application No. PCT/IB2021/059259; Jan. 5, 2022; 12 pages.

*Primary Examiner* — Zachary T Dragicevich
*Assistant Examiner* — James A Linford
(74) *Attorney, Agent, or Firm* — Foley & Lardner LLP

(57) ABSTRACT

A pipe fitting assembly to allow for connecting of piping elements by inserting into the pipe fitting, and without the necessity of glued, soldered, or threaded connections. The fitting assembly can include a body element having an inlet and an outlet along a longitudinal axis. The body element can include a sealing recession and a retention recession. The fitting assembly can include a sealing ring to be inserted in the sealing recession, a spacer ring to also be inserted in the sealing recession, a grip ring to be inserted in the retention recession, or a retainer ring to be inserted in the retention recession and fixed to the body element.

11 Claims, 11 Drawing Sheets

(56) References Cited

U.S. PATENT DOCUMENTS

| | | | |
|---|---|---|---|
| 9,604,404 B2* | 3/2017 | Ericksen | F16L 37/008 |
| 9,611,970 B2* | 4/2017 | Spears | F16L 55/1157 |
| 9,765,912 B2* | 9/2017 | Spears | F16L 27/12 |
| 10,790,600 B2 | 9/2020 | Purdy et al. | |
| 10,920,892 B2* | 2/2021 | O'Neill | F16K 1/32 |
| 11,384,872 B1* | 7/2022 | Ericksen | B29C 66/543 |
| 2003/0111840 A1 | 6/2003 | O'Neill et al. | |
| 2003/0227169 A1* | 12/2003 | Fritze | F16L 37/091 |
| | | | 285/322 |
| 2004/0021318 A1* | 2/2004 | Fritze | B29C 66/52292 |
| | | | 285/21.1 |
| 2012/0169039 A1 | 7/2012 | Crompton | |
| 2016/0327196 A1 | 11/2016 | Gledhill et al. | |
| 2017/0198842 A1* | 7/2017 | Ericksen | B29C 66/612 |

FOREIGN PATENT DOCUMENTS

| | | | | |
|---|---|---|---|---|
| EP | 1669655 A1 * | 6/2006 | | F16L 37/091 |
| EP | 2 109 517 B1 | 11/2011 | | |
| GB | 2071798 A * | 9/1981 | | F16L 37/091 |
| WO | WO-2019/051279 A1 | 3/2019 | | |
| WO | WO-2019/067333 A1 | 4/2019 | | |

* cited by examiner

PUSH-TO-CONNECT FITTING SYSTEMS AND METHODS

CROSS-REFERENCE TO RELATED APPLICATIONS

The present application is the National Stage of International Application No. PCT/IB2021/059259, filed Oct. 8, 2021, which claims the benefit of priority to U.S. Provisional Application No. 63/090,815, filed Oct. 13, 2020, the entire disclosures of which are incorporated herein by reference.

BACKGROUND

Push-to-connect fittings are fittings that couple to pipes by simply inserting a pipe and pushing into place. These types of fittings are commonly used in conjunction with various kinds of plastic piping or tubing, but also can be designed for use with soft metallic pipe.

SUMMARY

At least one aspect relates to a push-to-connect fitting assembly. The push-to-connect fitting assembly can include a body having an inlet and an outlet along a first longitudinal axis. The push-to-connect fitting assembly can include an inlet housing maintained between the inlet and a center of the body. The inlet housing can include an inner surface to receive a piping element. The push-to-connect fitting assembly can include a sealing recession maintained within the inlet housing. The sealing recession can include a curved sealing ring engaging surface. The push-to-connect fitting assembly can include a sealing ring maintained within the sealing recession. The sealing ring can form a seal between the piping element and the sealing recession. The push-to-connect fitting assembly can include a retention recession maintained within the inlet housing and disposed between the sealing recession and the inlet. The push-to-connect fitting assembly can include a grip ring disposed between an upper surface of the retention recession and a retainer ring. The grip ring can have a plurality of teeth angled inwardly from and along the circumference of the grip ring, cooperatively engaged with the outwardly angled lower surface of the spacer ring. The push-to-connect fitting assembly can include the retainer ring having an inner surface cooperatively engaged with the piping element, an upper outer surface cooperatively engaged with the retention recession, and an inwardly angled upper surface cooperatively engaged with the grip ring.

At least one aspect relates to a method of assembling a push-to-connect pipe fitting assembly. The method can include providing a body element defining an abutment, and an inlet housing with a sealing recession and a retention recession. The method can include inserting at least one sealing ring and a spacer ring into the sealing recession. The method can include inserting a grip ring into the retention recession. The method can include inserting a retainer ring into the retention recession. The method can include fixing the retainer ring to the body element.

At least one aspect relates to a method of assembling a push-to-connect fitting assembly. The method can include providing a body element having an inlet housing with a sealing recession, a retention recession, or a retention ring. The method can include inserting at least one sealing ring and a spacer ring into the sealing recession. The method can include inserting a grip ring into the retention recession.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure generally refers to systems and methods for assembling a push-to-connect fitting assembly. This technical solution is generally directed to a fitting assembly for connecting to a piping element. Specifically, this technical solution is generally directed to a fitting assembly that can couple to a portion of a piping element and can remain coupled under various pressures of fluid within the piping element. The fitting assembly generally includes a grip ring with a plurality of angled teeth to facilitate gripping one or more portions of the piping element to prevent translational movement between the fitting assembly and the piping element, such that the fitting assembly and piping element do not lose its relative seal.

The fitting assembly can include one or more features to support the grip ring. For example, the fitting assembly can include a spacer ring and a retainer ring to engage with a portion of the grip ring to further facilitate maintaining the seal between the fitting assembly and the piping element. The fitting assembly can include one or more features to prevent rotational movement between the fitting assembly and the piping element. For example, the fitting assembly can include one or more pointed projections that facilitate preventing rotational movement and providing easy assembly between the fitting assembly and the piping element.

Figure 1:
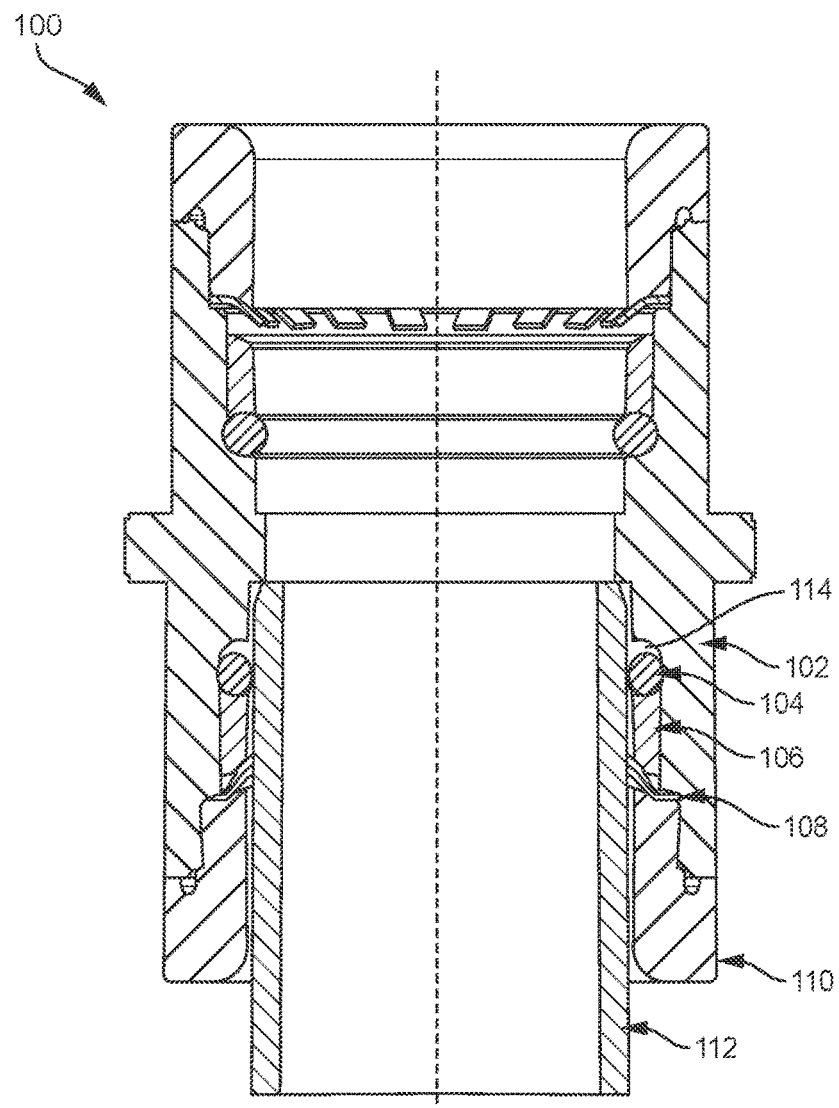
FIG. 1 is a cross-sectional view of a push-to-connect pipe fitting assembly, in accordance with an implementation.

Referring to FIG. 1, among others an example cross-sectional view of a push-to-connect fitting assembly 100 is shown. The push-to-connect fitting assembly 100 can include a body element 102, a sealing ring 104, a spacer ring 106, a grip ring 108, and a retainer ring 110. A piping element 112 as shown in FIG. 1 can be inserted into the push-to-connect fitting assembly 100 until the piping element 112 abuts the body element 102. The inserted piping element 112 can be any impressionable pipe or tubing (e.g., copper, CPVC, PEX).

The sealing ring 104 can be any part that seals between the body element 102 and the piping element 112 (e.g., o-ring, square o-ring, gasket, packing ring). Although the push-to-connect fitting assembly 100 shows a single sealing ring 104, the assembly can use two or more sealing rings 104 to create a sufficient seal between the body element 102 and the piping element 112. The sealing ring can be maintained between the body element 102 and the piping element 112 and can be cooperatively engaged with the spacer ring 106, thus allowing for axial translation. The sealing ring 104 and the spacer ring 106 can be fixed. The sealing ring can have a coating and can be lubricated. For example, the sealing ring can be coated in Polytetrafluoroethylene (PTFE). In another example, the sealing ring can be covered in talcum powder and/or other lubricants.

The inserted piping element 112 can create a fluid passage 114 that passes from the piping element 112, between the piping element 112 and the body element 102 up to the sealing ring 104. This fluid passage 114 can maintain a pressure equal to or substantially similar (e.g., ±5%, ±10%) to the pressure maintained within the piping element 112. The pressure maintained within the fluid passage 114 can impose a force on an upper surface of the sealing ring 104. The force imposed on the sealing ring 104 can then impose a force on the spacer ring 106, which in turn imposes a force on the grip ring 108. The force imposed upon the grip ring, as will be described in greater detail below, can increase the grip upon the piping element 112, thus reducing the possibility of the piping element 112 translating axially with respect to the body element 102.

A push-to-connect fitting assembly 100 can be used in many configurations. The push-to-connect fitting assembly 100 shows an example of a push-to-connect coupling. It should be appreciated that the push-to-connect fitting can be incorporated in a number of other types of fittings (e.g., ell, tee, push-to-connect fitting to a male pipe thread, push-to-connect fitting to a female pipe thread, push-to-connect fitting to solder joint).

The piping element 112 can be removed from the push-to-connect fitting assembly 100. For example, a cylindrical insert can be inserted between the piping element 112 and the retainer ring 110 and pushed against grip ring 108 causing the grip ring to release the piping element 112. This is an example configuration of a method for releasing a piping element 112 from a push-to-connect fitting assembly 100 and many other configurations are possible. For example, the retainer ring 110 can be fixed to the body element 102 by compatible threads. In this instance retainer ring 110 can be unthreaded and the piping element 112 can be removed.

Figure 2:
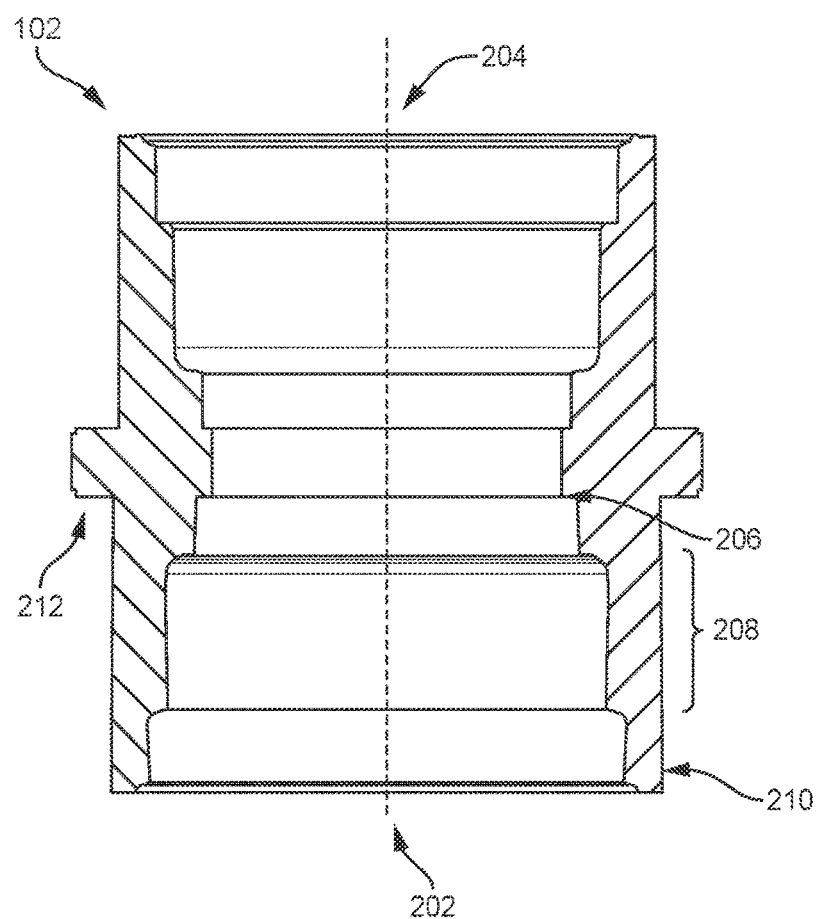
FIG. 2 is a cross-sectional view of a body element, in accordance with an implementation.

Referring to FIG. 2, among others an example cross-sectional view of the body element 102 is shown. The body element 102 can be defined by an inlet 202 and an outlet 204 along a first longitudinal axis. An inlet housing can be maintained between the inlet 202 and the center of the body element 102. The body element 102 can include a sealing recession 208 and a retention recession 210 both maintained within the inlet housing. The body element 102 can be made of any suitable material (e.g., Chlorinated Poly Vinyl Chloride (CPVC)).

An abutment 206 can be formed on an inner surface of the body element 102 disposed between the center of the body element 102 and a sealing recession 208. The abutment 206 can act to limit the insertion of the piping element 112 and ensure the piping element 112 does not pass beyond the inlet housing. The abutment 206 can have a squared, angled, or rounded edge. The abutment 206 can have a height greater than a wall thickness of the piping element 112. The abutment 206 can have a height less than the wall thickness of the piping element 112.

The sealing recession 208 can be maintained between the center of the body element 102 and the retention recession 210. There can be a section of the inlet housing between the abutment 206 and the sealing recession 208 that has a diameter marginally larger than the outside diameter of the piping element 112 (e.g., +2 mm, +0.125 in). This section can be able to stabilize the piping element in the push-to-connect fitting assembly 100 and allow for the fluid passage 114 of FIG. 1 between the inner surface of the body element 102 and the piping element 112. The section can be of sufficient length to accommodate an angled cut (e.g., 5°, 10°, 15° of the piping element 112. The sealing recession 208 can be recessed in the inner surface of the body element 102. An upper surface of the sealing recession 208 can rounded. In these instances, the sealing ring 104 of FIG. 1 can be an o-ring and the diameter of the rounded upper surface can be equal to the diameter of the o-ring. Those of skill in the art will appreciate that the rounded upper surface can prevent the sealing ring 104 from becoming pinched or deformed upon the insertion of the piping element 112. The sealing recession 208 can be used to maintain the sealing ring 104 and the spacer ring 106. The axial length of the sealing recession 208 can be greater than a combined height of the sealing ring 104 and the spacer ring 106. This excess length can allow for an axial translation of the sealing ring 104 and the spacer ring 106, which will be appreciated with reference to the grip ring 108 as described below.

The retention recession 210 can be located between the sealing recession 208 and the inlet 202. The retention recession 210 can be formed to hold the grip ring 108 and the retainer ring 110. The retention recession 210 can be recessed further within the inner surface of the body element 102 than the sealing recession 208. The further recession can create an upper surface of the retention recession 210 that can function as an abutment for the grip ring 108. The lower surface of the retention recession 210, at the inlet of the body element 102, can be formed to create a surface or further recession that allows ultra-sonic welding between the body element 102 and the retainer ring 110. The inner surface of the retention recession 210 can contain female threads (e.g., NPTF, ASME) to allow for the retainer ring 110 to be thread inside of the retention recession 210. The inner surface of the retention recession 210 can comprise a series of steps (i.e., the inverse of a barbed fitting) that would allow the retainer ring 110, structured as a barb fitting to be inserted within the retention recession 210. The configurations laid out above are examples and do not represent all of the possible configurations to allow the fixing of the retention recession 210 to the retainer ring 110. For example, the body element 102 can be configured with a latching mechanism, a screw or bolt can be used to fix the retainer ring 110 to the body element 102, etc.

At the center of the body element 102 on an outer surface of the body element 102, a grip 212 can be formed extending radially outward from the outer surface of the body element 102. The grip 212 can be formed to allow for an installer to hold the grip 212 or apply a force on the grip 212 to assist in inserting a piping element 112. The grip can have sections of radially symmetrical flat outer surfaces to allow the installer to use a tool (e.g., wrench) to rotate the body element 102 around the first longitudinal axis.

Figure 3:
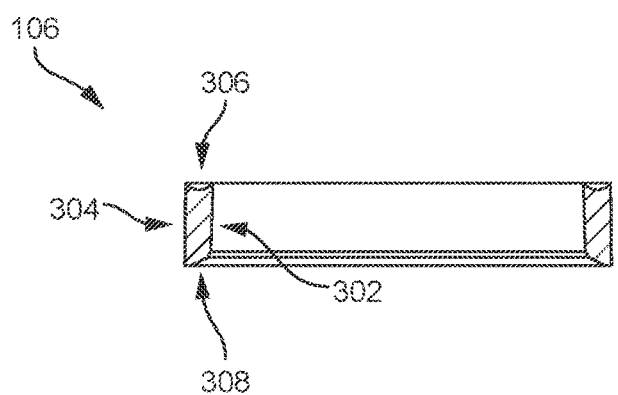
FIG. 3 is a cross-sectional view of a spacer ring, in accordance with an implementation.

Referring now to FIG. 3, among others a cross-sectional view of a spacer ring 106 is shown. The spacer ring 106 can be maintained within the sealing recession 208 and can include an inner surface 302, an outer surface 304, an upper surface 306, and a lower surface 308. The inner surface 302 can be cooperatively engaged with an outer wall of the piping element 112. The outer surface 304 can be cooperatively engaged with an inner wall of the body element 102 within the sealing recession 208. The cooperative engagement between the spacer ring 106 and the piping element 112 and the body element 102 can allow the spacer ring to translate and rotate axially. The ability of the spacer ring 106 to rotate about the first longitudinal axis of the body element 102 or axially translate can be limited or completely fixed. This can cause the piping element to be completely fixed. This can be beneficial, for example, the push-to-connect fitting assembly 100 can be fixed to inhibit rotation in the instances that the push-to-connect fitting assembly 100 has a threaded connection on the outlet 204. The spacer ring 106 can have a single cut on one side of the spacer ring 106 in the axial direction, creating a split ring. The split ring can have the ability to overlap the cut ends, thus allowing it to fit within a body element 102 with a retainer ring 110 that has been pre-fixed to the body element 102. The cut through the spacer ring 106 can be at an angle from the axial direction. The angle of the cut can be any angle through the spacer ring (e.g., 15°, 30°, 45°, 90°. The angle of the cut can be beneficial as it can function to hold the sealing ring 104 in place. The angle of the cut can also reduce the possibility that the sealing ring 104 could pass through a gap in the spacer ring 106. In such a configuration as shown above, the angled cut through the spacer ring 106 is of a small width (e.g., 0.001 inches, 0.005 inches, 0.25 inches).

The upper surface 306 of the spacer ring 106 can be cooperatively engaged with the sealing ring 104. For example, the sealing ring 104 can be able to rotate and translate freely with respect to the spacer ring 106. The upper surface 306 of the spacer ring 106 can include a contoured surface such that the center of the upper surface 306 is recessed. In this instance, the contour of the upper surface 306 can be beneficial, as it can inhibit the sealing ring 104 from extruding through any gaps in the spacer ring 106 or around the spacer ring 106. The sealing ring 104 and the spacer ring 106 can be formed as a unitary piece, thus fixing the spacer ring 106 to the sealing ring 104 inhibiting any rotation or translation with respect to the sealing ring 104.

The lower surface 308 of the spacer ring 106 can be cooperatively engaged with the grip ring 108. The lower surface 308 can be outwardly angled. For example, the outward angle of the lower surface 308 can translate the downward force received from the sealing ring 104 into an angled force upon the grip ring 108. The outward angle of the lower surface 308 can depend on the size of the push-to-connect fitting assembly 100 (e.g., 15°, 30°, 45°, 60°). The spacer ring 106 can be made of any suitable material (e.g., CPVC, aluminum).

Figure 4:
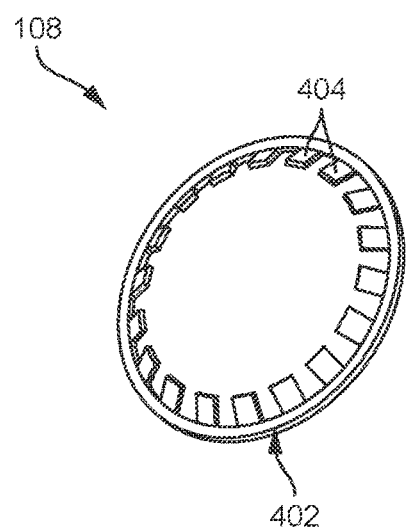
FIG. 4 is an isometric view of a grip ring, in accordance with an implementation.

Referring now to FIG. 4, among others an isometric view of a grip ring 108 is shown. The grip ring 108 can be maintained within the retention recession 210 cooperatively engaged between the upper surface of the retention recession 210 and the retainer ring 110. The grip ring 108 includes a body 402 and a plurality of teeth 404. The body 402 of the grip ring 108 can be longitudinally fixed, preventing the grip ring 108 from moving axially. The plurality of teeth 404 can be inwardly angled. For example, the angle of the plurality of teeth 404 can allow an installer to easily insert a piping element 112, but prevent the piping element 112 from being removed. The angle of the plurality of teeth can depend on the size of the push-to-connect fitting assembly 100 (e.g., 15°, 30°, 45°, 60°).

The plurality of teeth 404 can have a square or rectangular shape, as shown in at least FIG. 4. The plurality of teeth 404 can have a triangular, trapezoidal, or pentagonal shape. In some examples, the plurality of teeth 404 can have a non-uniform shape from a first end to a second end (e.g., non-uniform in dimension or shape). In some examples, each tooth of the plurality of teeth 404 can vary in shape. For example, a first tooth of the plurality of teeth 404 can have a first shape and a second tooth of the plurality of teeth 404 can have a second shape that is different from the first shape. In some examples, the plurality of teeth 404 can include a concave or convex shape to facilitate gripping one or more portions of the piping element 112. The grip ring 108 can have a single cut on one side of the grip ring 108 in the axial direction, creating a split ring. The split ring can have the ability to overlap the cut ends, thus allowing it to fit within a body element 102 with a retainer ring 110 that has been pre-fixed.

The upper surface of the plurality of teeth 404 can be cooperatively engaged with the lower surface 308 of the spacer ring 106. The cooperative engagement between the spacer ring 106 and the grip ring 108 can cause the grip on the piping element 112 by the grip ring 108 to increase as the pressure of the fluid inside the piping element 112 increases. For example, and with reference to FIG. 1, FIG. 2, and FIG. 4, as the pressure of the fluid inside the piping element 112 increases, the pressure within the fluid passage 114 can also increase. The increased pressure within the fluid passage 114 can then pass into the sealing recession 208 which can impose a force on an upper surface of the sealing ring 104 which can be passed through the spacer ring 106 onto the plurality of teeth 404 of the grip ring 108. The imposed force upon the plurality of teeth 404 of the grip ring 108 can function to partially embed the plurality of teeth 404 into the outer surface of the piping element 112 or increase the friction imposed by the plurality of teeth 404 on the outer surface of the piping element 112 inhibiting the axial translation of the piping element with respect to the body element 102.

The lower surface of the plurality of teeth 404 can be supported by retainer ring 110. The support from the retainer ring 110 can inhibit the plurality of teeth from deflecting beyond a certain angle (e.g., 15°, 30°, 45°, 60°). For example, as the pressure of the fluid within the piping element 112 increases, the plurality of teeth 404 are deflected by the spacer ring 106. To limit this deflection and/or prevent inversion of the plurality of teeth 404, the retainer ring 110 can support the plurality of teeth 404. Additionally or alternatively, the piping element 112 can experience a force that can push or pull the piping element 112 from the inlet housing of the body element 102. To prevent this, the plurality of teeth 404 of the grip ring 108 can engage with the outer surface of the piping element 112 and deflect, increasing the grip force by the plurality of teeth 404 with the increased deflection. In this instance, the body 402 and the plurality of teeth 404 of the grip ring 108 can be supported by the retainer ring 110, inhibiting any axial translation of the grip ring 108 and/or over deflection of the plurality of teeth 404.

The grip ring 108 can be made of any suitable material (e.g., stainless steel). In one example, the grip ring 108 can be punched from a sheet of stainless steel and further formed to dispose the plurality of teeth 404 at a desired angle (e.g., 15°, 30°, 45°, 60°). Additionally or alternatively, the grip ring 108 can have features (e.g., bumps, recessions) that are correspondingly formed with the body element 102 and/or the retainer ring 110 to rotationally fix the grip ring 108 with respect to the body element 102 and/or the retainer ring 110 as described in greater detail below.

Figure 5:
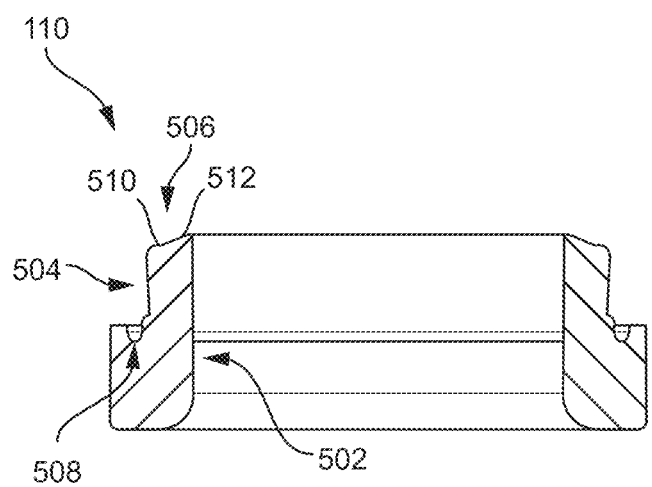
FIG. 5 is a cross-sectional view of a retainer ring, in accordance with an implementation.

Referring now to FIG. 5, among others a cross-sectional view of a retainer ring 110 is shown. The retainer ring 110 can be partially maintained within the retention recession 210 and partially maintained outside of inlet 202 of the body element 102. The retainer ring 110 can be defined by an inner surface 502, an upper outer surface 504, an upper surface 506, and a flash trap 508. It should be noted that the flash trap 508 may not be present. The retainer ring 110 can be used to retain the sealing ring 104, the spacer ring 106, and the grip ring 108 within the body element 102.

The inner surface 502 can be cooperatively engaged with the outer surface of the piping element 112. The inner surface 502 can act as a form of guidance for the insertion of the piping element. Accordingly, the inner surface 502 can allow for a translation and rotation of the piping element 112.

The upper outer surface 504 can be maintained within the retention recession 210 of the body element 102. The upper outer surface 504 can be a smooth surface, as shown in FIG. 5, which can be inserted in to the retention recession 210 of the body element 102. The upper outer surface 504 can be formed with male threads that allow the retainer ring 110 to be threaded into the retention recession 210 of the body element 102. Alternatively, the upper outer surface 504 can be formed with male barbs that can allow for the retainer ring 110 to be inserted into a similarly formed retention recession 210 of the body element 102. The configurations laid out above do not represent all of the configurations that allow for the retainer ring 110 to be inserted into the retention recession 210. For example, the retainer ring 110 can be configured to receive a latch from the body element 102, the retainer ring can be configured to be bolted or screwed to the body element 102, etc.

The upper surface 506 can be maintained within the retention recession 210 of the body element 102. The upper surface 506 can be defined by a flat outer area 510 and an inwardly angled inner area 512. The flat outer area 510 of the upper surface 506 can hold the body 402 of the grip ring 108 against the upper surface of the retention recession 210. The body 402 can be cooperatively engaged with the upper surface 506 of the grip ring, thus allowing the grip ring 108 to rotate as needed. This can be beneficial, as it can reduce torsional stress on the piping element 112 and stress on the plurality of teeth 404 by allowing the grip ring 108 and the piping element 112 to rotate as needed without the piping element 112 being removed from the push-to-connect fitting assembly 100. The grip ring 108 can be fixed to the upper surface 506 of the retainer ring 110 (e.g., molded as one, glued). There can be a space between the grip ring 108 and the upper surface 506 allowing for deflection of the body 402 when inserting a piping element 112.

The inwardly angled upper surface 506 of the retainer ring 110 can support the plurality of teeth 404 of the grip ring 108. As disclosed above, the pressure of the fluid inside the piping element 112 and/or a force on the piping element 112 can cause the plurality of teeth 404 to deflect. To inhibit the plurality of teeth 404 of the grip ring 108 from inverting, the inwardly angled upper surface 506 of the retainer ring 110 can support the plurality of teeth 404 at an inward angle (e.g., 15°, 30°, 45°, 60°.

The retainer ring 110 can include a flash trap 508. The flash trap 508 can be used to collect the flash created during an ultrasonic welding process between the retainer ring 110 and the body element 102. It should be appreciated that this is an example, and if other methods for fixing the retainer ring 110 to the body element 102 are used, the flash trap 508 may not be incorporated in the design of the retainer ring 110.

The push-to-connect fitting assembly 100 can include one or more features to facilitate inhibiting rotational movement between a portion of the push-to-connect fitting assembly 100, such as the body element 102, and the piping element 112. For example, when there is little to no force upon the grip ring 108, the body element 102 may freely rotate relative to the piping element 112. In some examples, the push-to-connect fitting assembly 100 can include one or more features to inhibit this rotational movement. In some examples, the push-to-connect fitting assembly 100 can include one or more features to inhibit rotational movement and axial movement of the body element 102 relative to piping element 112. In some examples, the push-to-connect fitting assembly 100 may include one or more features to inhibit only rotational movement of the body element 102 relative to the piping element 102. In some examples, the push-to-connect fitting assembly 100 may not include these features such that the push-to-connect fitting assembly 100 only includes one or more features to inhibit axial movement of the body element 102 relative to the piping element 112, while still allowing rotational movement of the body element 102 relative to the piping element 112.

Figure 6:
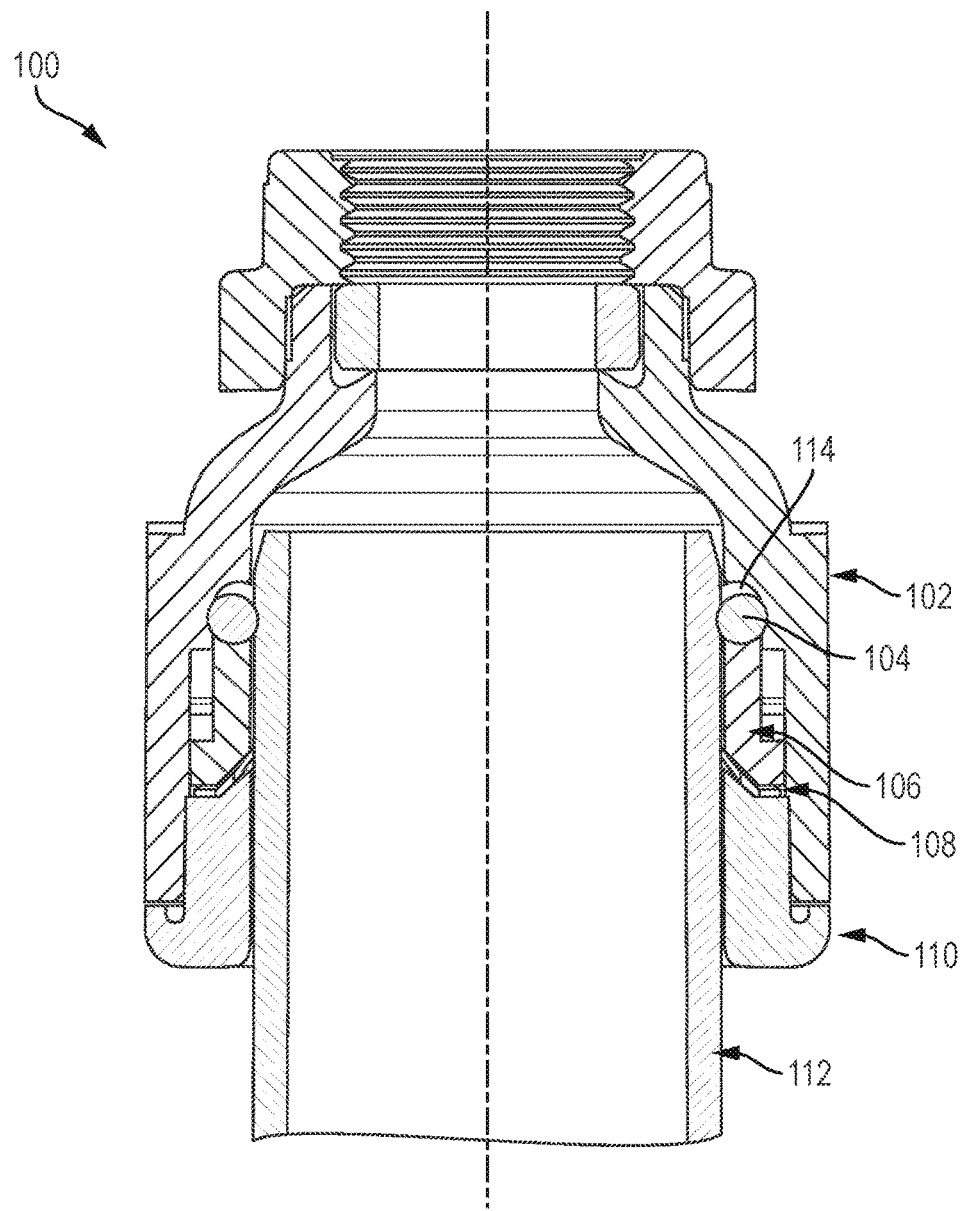
FIG. 6 is a cross-sectional view of a push-to-connect fitting assembly, in accordance with an implementation.
Figure 7:
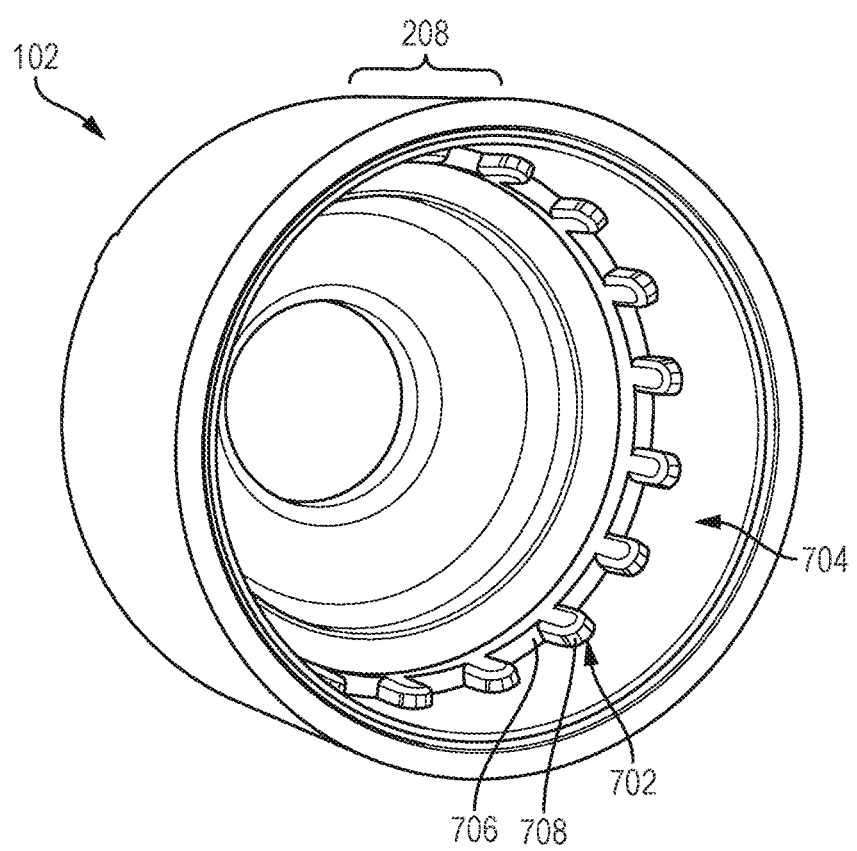
FIG. 7 is an isometric view of a portion of a body element, in accordance with an implementation.

Referring now to FIG. 6, among others, a cross-sectional view of a push-to-connect fitting assembly 100 is shown. The push-to-connect fitting assembly 100 can include a body element 102, a sealing ring 104, a spacer ring 106, a grip ring 108, and a retainer ring 110. Referring now to FIG. 7, among others, the push-to-connect fitting assembly 100 can include one or more protruding features to facilitate inhibiting rotational movement between the push-to-connect fitting assembly 100 and a coupled pipe, such as the piping element 112. For example, the body element 102 can include one or more pointed protrusions 702 shown in at least FIG. 7. The pointed protrusions 702 can extend along a portion of the sealing recession 208 of the body element 102 or another interior portion of the body element 102. For example, each pointed protrusion 702 can extend from a base portion 706 of the sealing recession 208 to a pointed portion 708 of the sealing recession 208. For example, the base portion 706 can include one or more surfaces of the pointed protrusion 702 that couple to an inner surface 704 of the body element 102. The pointed portion 708 can include one or more angled surfaces to engage with another portion of the push-to-connect fitting assembly 100, such as the spacer ring 106.

The pointed portion 708 of the pointed protrusion 702 can facilitate easy alignment during assembly of the push-to-connect fitting assembly 100 with another portion of the fitting 100, such as the spacer ring 106, as discussed below. The push-to-connect fitting assembly 100 can include a various amount of pointed protrusions 702. For example, the push-to-connect fitting assembly 100 can include one pointed protrusion 702. The push-to-connect fitting assembly 100 can include two pointed protrusions 702, according to another example. The push-to-connect fitting assembly 100 can include more than two pointed protrusions 702, according to yet another example.

Figure 8:
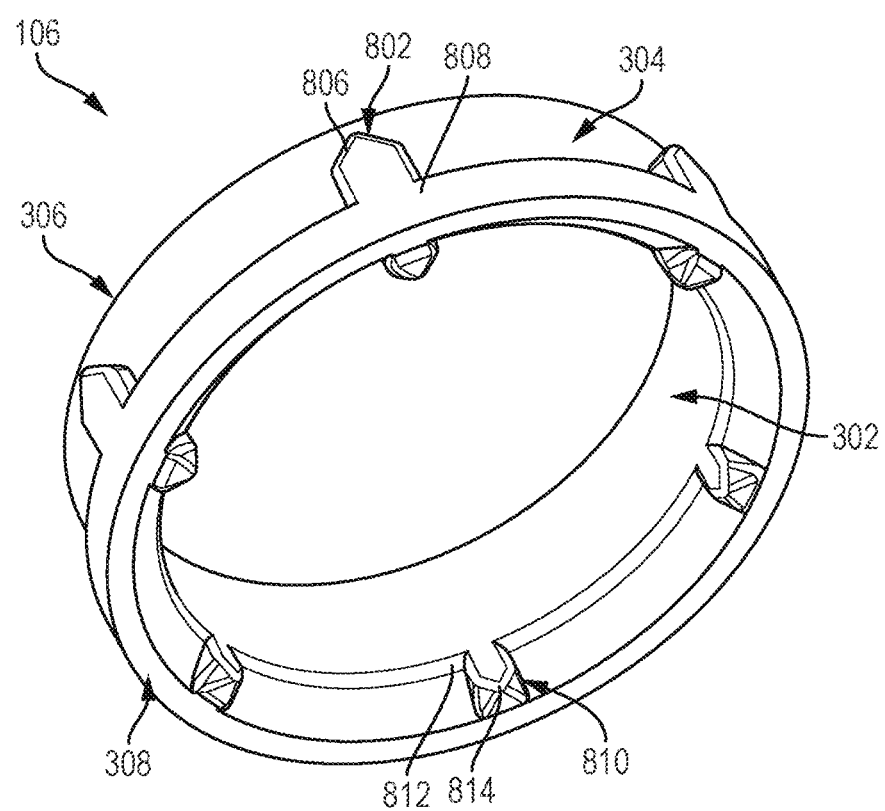
FIG. 8 is an isometric view of a spacer ring, in accordance with an implementation.

Referring to FIG. 8, among others, an isometric view of the spacer ring 106 is shown. The spacer ring 106 can include one or more pointed projections 802. For example, the spacer ring 106 can include a plurality of pointed projections 802 disposed along the outer surface 304 of the spacer ring 106. The pointed projections 802 can extend from a base portion 808 of the spacer ring 106 towards a pointed portion 806, as shown in FIG. 8 and among others. For example, the base portion 808 can include one or more surfaces of the pointed projection 802 that couple to the outer surface 304 of the spacer ring 106. The pointed portion 806 can include one or more angled surfaces to engage with another portion of the push-to-connect fitting assembly 100, such as the body element 102.

The pointed projections 802 of the spacer ring 106 can each engage with a portion of the corresponding pointed protrusions 702 of the push-to-connect fitting assembly 100. For example, the pointed projections 802 can extend in an opposing direction relative to the pointed protrusions 702 (e.g., such that the direction of the base portion 808 to the pointed portion 806 of the pointed projections 802 opposes the direction of the base portion 706 to the pointed portion 708 of the pointed protrusions 702). This configuration can facilitate aligning the spacer ring 106 with the body element 102 of the push-to-connect fitting assembly 100 during assembly (e.g., during insertion of piping element 112). For example, the pointed portion 708 of one pointed protrusion 702 can engage with (e.g., touch, contact) the pointed portion 806 of one pointed projection 802. The angle of the pointed portion 806 of the pointed projection 802 and the angle of the pointed portion 708 of the pointed protrusion 702 can cause slight rotation of the spacer ring 106 relative to the body element 102 during insertion of the spacer ring 106 or piping element 112 to correctly align the spacer ring 106 relative to the body element 102 (e.g., self-alignment). The pointed projections 802 of the spacer ring 106 and the pointed protrusions of the body element 102 can facilitate self-alignment of the spacer ring 106 relative to the to body element 102 through either manual assembly (e.g., user-implemented) or automatic assembly (e.g., machine actuated) of the push-to-connect fitting assembly 100.

The spacer ring 106 can include a various amount of pointed projections 802. For example, the spacer ring 106 can include one pointed projection 802. The spacer ring 106 can include two pointed projections 802, according to another example. The spacer ring 106 can include more than two pointed projections 802, according to yet another example.

The spacer ring 106 can include one or more pointed bosses 810 to facilitate easy assembly of the push-to-connect fitting assembly 100 or inhibit rotational movement of the spacer ring 106 relative to the body element 102 when the spacer ring 106 is coupled to the body element 102 (e.g., post-assembly). For example, the pointed boss 810 can extend from a portion of the inner surface 302 of the spacer ring 106, as shown in FIG. 8, and among others. The pointed bosses 810 can extend between a base portion 812 and a pointed portion 814. For example, the base portion 812 can include one or more surfaces that couple to a portion of the inner surface 302 of the spacer ring 106. The pointed portion 814 can include one or more angled surfaces to engage with another portion of the push-to-connect fitting assembly 100, such as the grip ring 108.

One or more of the pointed portions 814 of the pointed bosses 810 can engage with a portion of a tooth 404 of the grip ring 108. For example, the pointed portion 814 of one pointed boss 810 can be disposed between two teeth 404 of the grip ring 108 when the grip ring 108 and the spacer ring 106 are coupled with the body element 102. The pointed portion 814 of the one pointed boss 810 can be disposed directly on top of a surface of one tooth 404 of the grip ring 108 when the grip ring 108 and the spacer ring 106 are coupled with the body element 102, according to another example. The engagement between the pointed boss 810 and the teeth 404 of the grip ring 108 can facilitate alignment of the push-to-connect fitting assembly 100 during assembly (e.g., during insertion of the piping element 112). The engagement between the pointed boss 810 and the grip ring 108 can facilitate inhibiting rotation of the grip ring 108 relative to the spacer ring 106 when the grip ring 108 is coupled with the push-to-connect fitting assembly 100. For example, the contact between the pointed boss 810 and a tooth 404 can cause a portion of the tooth 404 to bend, collapse, or otherwise deform to engage with a portion of the piping element 112.

The spacer ring 106 can include a various amount of pointed bosses 810. For example, the spacer ring 106 can include one pointed boss 810. The spacer ring 106 can include two pointed bosses 810, according to another example. The spacer ring 106 can include more than two pointed bosses 810, according to yet another example.

In some examples, the plurality of teeth 404 may include one or more features to facilitate inhibiting rotational movement of the push-to-connect fitting assembly 100 relative to the piping element 112. For example, as described above, the plurality of teeth 404 may include various shapes. The plurality of teeth 404 may include various shapes or components to facilitate preventing rotation of the piping element 112 relative to the push-to-connect fitting assembly 100, for example. In some examples, at least one tooth of the plurality of teeth 404 may include a pointed, angled, concave, or convex portion to facilitate gripping one or more portions of the piping element 112 and inhibiting rotation of the piping element 112. In some examples, a first tooth of the plurality of teeth 404 may include a pointed or angled portion to facilitate inhibiting rotational movement of the piping element 112 in a first direction (e.g., a clockwise direction) and a second tooth of the plurality of teeth 404 may include a portion or angled portion to facilitate inhibiting rotational movement of the piping element 112 in a second direction (e.g., a counterclockwise direction).

Figure 9:
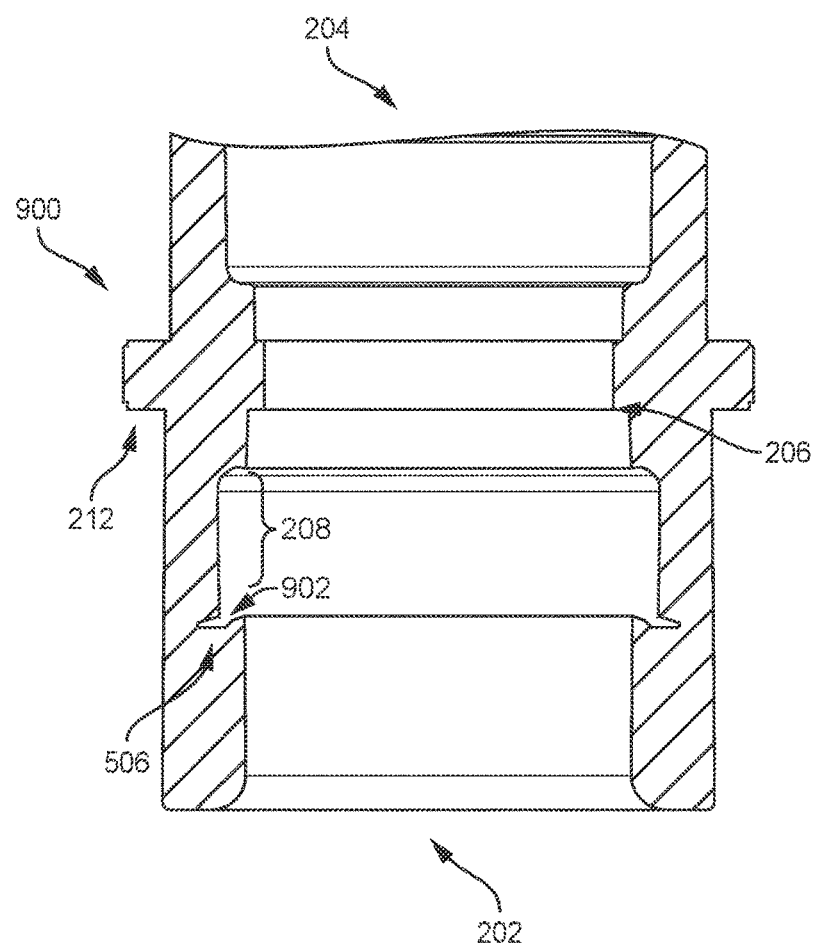
FIG. 9 is a cross-sectional view of a retaining body element, in accordance with an implementation.

Referring now to FIG. 9, among others, a cross-sectional view of a retaining body element 900 is shown. The retaining body element 900 can have features sufficiently equal to a body element 102 and retainer ring 110 that have been fixed. It should be appreciated that forming the body element 102 and the retainer ring 110 as a single retaining body element 900 can reduce manufacturing price and time to manufacture, as well as increase the strength of the push-to-connect fitting assembly 100. The retaining body element 900 can be defined by an inlet 202 and an outlet 204 along a first longitudinal axis. An inlet housing can be maintained between the inlet 202 and a center of the retaining body element 900. The retaining body element 900 can include a sealing recession 208 and a grip ring recession 902 both maintained within the inlet housing. The retaining body element 900 can be made of any suitable material (e.g., CPVC, aluminum).

An abutment 206 can be formed on an inner surface of the retaining body element 900 at the center of the retaining body element 900. The abutment 206 can be formed to limit the insertion of the piping element 112 and ensure the piping element 112 does not pass beyond the inlet housing. The abutment 206 can have a squared, angled, or rounded edge. The abutment 206 may not have a height greater than a wall thickness of the piping element 112. The abutment 206 can have a height greater than the wall thickness of the piping element 112. For example, the push-to-connect fitting assembly 100 can be used to limit the flow of the fluid passing within the piping element 112.

The sealing recession 208 can be maintained between the center of the retaining body element 900 and the grip ring recession 902. There can be a section of the inlet housing between the abutment 206 and the sealing recession 208 that has a diameter marginally larger than the outside diameter of the piping element 112 (e.g., +2 mm, +0.125 in, +0.5 in) this section can be able to stabilize the piping element in the push-to-connect fitting assembly 100 and allow for the fluid passage 114 of FIG. 1 between the inner surface of the body element 102 and the piping element 112. The sealing recession 208 can be recessed in the inner surface of the retaining body element 900. An upper surface of the sealing recession 208 can rounded. In these instances, the sealing ring 104 of FIG. 1 can be an o-ring and the diameter of the rounded upper surface can be equal to the diameter of the o-ring. Those of skill in the art will appreciate that the rounded upper surface can prevent the sealing ring 104 from becoming pinched or deformed upon the insertion of the piping element 112. The sealing recession 208 can be used to maintain the sealing ring 104 and the spacer ring 106. The axial length of the sealing recession 208 can be greater than a combined height of the sealing ring 104 and the spacer ring 106. This excess length can allow for an axial translation of the sealing ring 104 and the spacer ring 106, which will be appreciated with reference to the grip ring 108 as described below.

The inwardly angled upper surface 506 of the retaining body element 900 can be located radially inward of the grip ring recession 902. The inwardly angled upper surface 506 of the retaining body element 900 can support the plurality of teeth 404 of the grip ring 108. As disclosed above, the pressure of the fluid inside the piping element 112 and/or a force on the piping element 112 can cause the plurality of teeth 404 to deflect. To inhibit the plurality of teeth 404 of the grip ring 108 from inverting, the inwardly angled upper surface 506 of the retainer ring 110 can support the plurality of teeth 404 at an inward angle (e.g., 15°, 30°, 45°, 60°.

Figure 10:
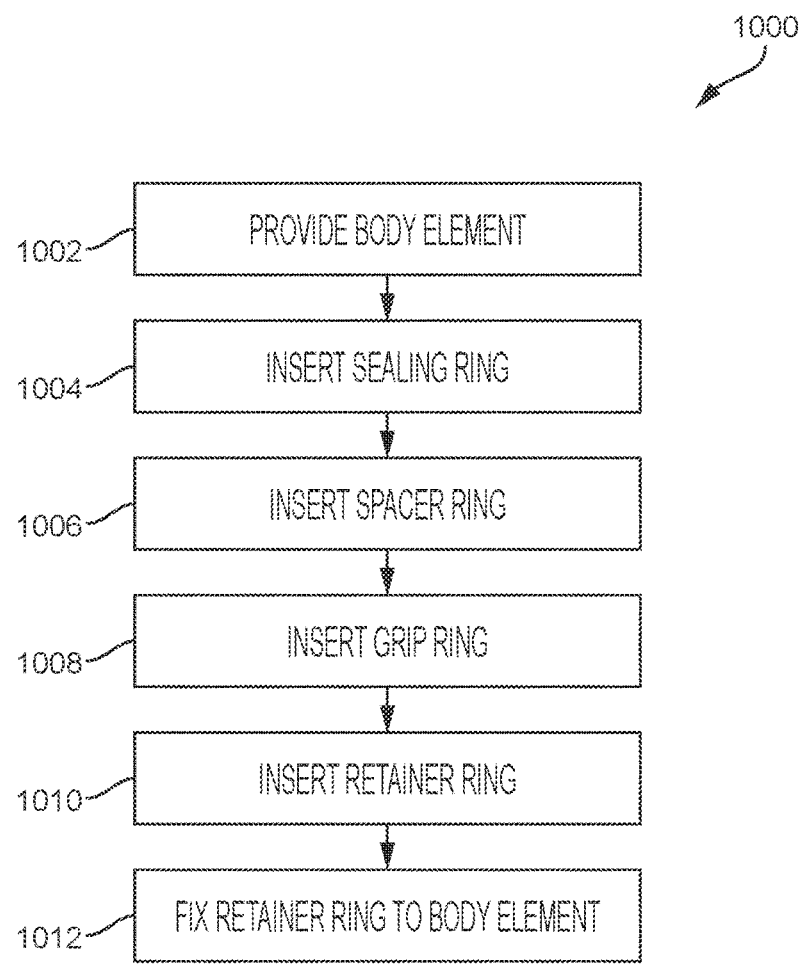
FIG. 10 is a flow chart of a method for assembling a push-to-connect fitting assembly.

Referring now to FIG. 10, among others a flow chart of a method for assembling a push-to-connect fitting assembly 100 is shown. The method 1000 can start at act 1002 by providing a body element 102. As described above, the body element 102 can be produced by a number of manufacturing methods (e.g., molding, machining) and made from a number of possible materials (e.g., CPVC, aluminum).

As depicted in act 1004 of the method 1000, the sealing ring 104 can be inserted into the sealing recession 208 of the body element 102 through the inlet 202. As depicted in act 1006 of the method 1000, the spacer ring 106 can be inserted into the sealing recession 208 of the body element 102. The sealing ring 104 and the spacer ring 106 can be formed as a unitary piece and thus acts 1004 and 1006 would be completed in a single act. As depicted in acts 1004 and 1006, the sealing ring 104 and/or spacer ring 106, respectively, can be lubricated prior to insertion to allow for movement within the sealing recession 208. In some examples, the body element 102 may be placed into one or more fixtures (e.g., custom pneumatic cylinder) to facilitate easy assembly. For example, one or more fixtures, collets, or elbow fittings may be used to facilitate assembly the push-to-connect fitting assembly 100.

As depicted in act 1008 of the method 1000, the grip ring 108 can be inserted in to the retention recession 210 of the body element 102. The grip ring 108 can be lubricated prior to insertion to allow for the rotation of the grip ring 108 with respect to the body element 102 along the first longitudinal axis. As depicted in act 1010 of the method 1000, the retainer ring 110 can be inserted into the retention recession 210 of the body element 102 abutting the grip ring 108.

As depicted in act 1012 of the method 1000, the retainer ring 110 can be fixed to the body element 102. The retainer ring 110 can be fixed to the body element 102 by ultrasonic welding. For example, high-frequency ultrasonic vibrations (e.g., vibrates at 20 thousand times per second) can be locally applied to the retainer ring 110 that is being held together with the body element 102 under pressure, the ultrasonic weld can create a solid-state weld. The retainer ring 110 can be fixed to the body element 102 by a chemical weld (e.g., solvent welding). Alternatively, or additionally, acts 1010 and 1012 of method 1000 can be combined. For example, in one example, the retainer ring 110 can have male threads on the upper outer surface 504 and the body element 102 can have female threads in the retention recession 210 that correspond with the threads of the retainer ring 110. In this instance, the retainer ring 110 can be fixed to the body element 102 by the corresponding threads. It should be appreciated that there are a number of suitable methods that can be employed to assemble a push-to-connect fitting assembly 100. It should be appreciated that this is an example assembly method and the push-to-connect fitting assembly 100 can be assembled in a different order or utilize different acts.

Figure 11:
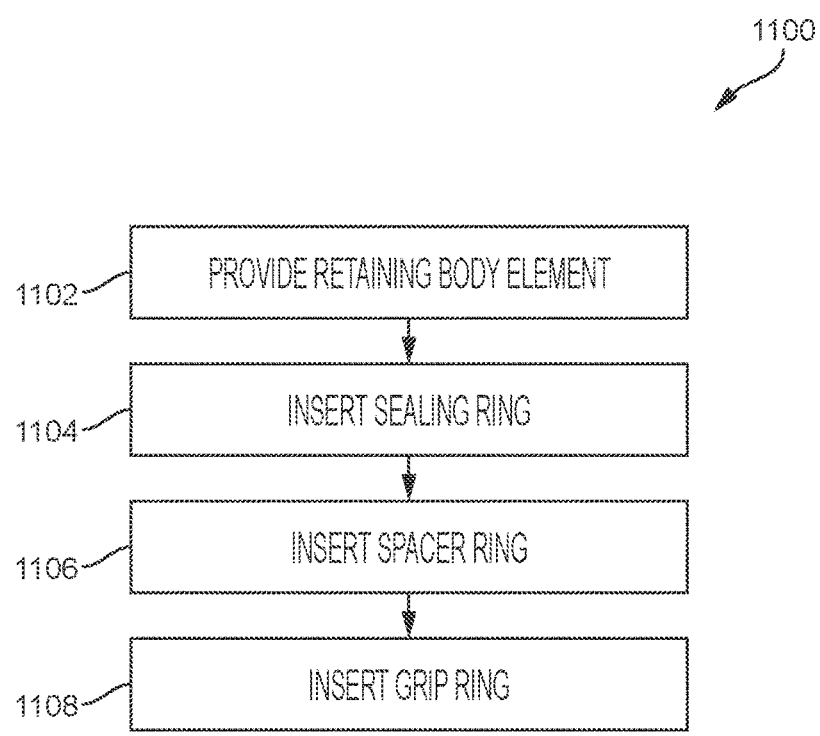
FIG. 11 is a flow chart of a method for assembling a push-to-connect fitting assembly including a retaining body element.

Referring now to FIG. 11, among others a flow chart of a method for assembling a push-to-connect fitting assembly 100 including a retaining body element 900 is shown. The method 1100 can start at act 1102 by providing a retaining body element 900. As described above, the retaining body element 900 can be produced by a number of manufacturing methods (e.g., molding, machining) and made from a number of possible materials (e.g., CPVC, Polyethylene, aluminum).

As depicted in act 1104 of the method 1100, a sealing ring 104 can be inserted into the sealing recession 208 of the retaining body element 900. As depicted in act 1106 of the method 1100, a split spacer ring 106, as described above, can be inserted into the sealing recession 208. A split spacer ring 106 can have a single cut on one side of the spacer ring 106 in the axial direction, creating a split ring. The split ring can have the ability to overlap the cut ends, thus allowing it to fit within a retaining body element 900. As depicted in acts 1104 and 1106, the sealing ring 104 and spacer ring 106, respectively, can be lubricated prior to insertion to allow for movement within the sealing recession 208.

As depicted in act 1108 of the method 1100, the grip ring 108 can be inserted in to the grip ring recession 902 of the retaining body element 900. The grip ring 108 can be lubricated prior to insertion to allow for the rotation of the grip ring 108 with respect to the body element 102 along the first longitudinal axis. The grip ring 108 can have a single cut on one side of the grip ring 108 in the axial direction, creating a split ring. The split ring can have the ability to overlap the cut ends, thus allowing it to fit within the retaining body element 900. These are example assembly methods and the push-to-connect fitting assembly 100 can be assembled in a different order or by utilizing different acts.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein can be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining can be stationary (e.g., permanent or fixed) or moveable (e.g., removable or releasable). Such joining can be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

What is claimed is:

1. A push-to-connect pipe fitting assembly, comprising:
a body having an inlet and an outlet along a first longitudinal axis;
an inlet housing maintained between the inlet and a center of the body, the inlet housing having an inner surface to receive a piping element;
a sealing recession maintained within the inlet housing, the sealing recession including a curved sealing ring engaging surface;

a sealing ring maintained within the sealing recession, the sealing ring to form a seal between the piping element and the sealing recession;

a spacer ring maintained within the sealing recession, the spacer ring defined by an inner surface cooperatively engaged with the piping element, an outer surface cooperatively engaged with the sealing recession, an upper surface cooperatively engaged with the sealing ring, and an outwardly angled lower surface;

a retention recession maintained within the inlet housing, disposed between the sealing recession and the inlet;

a grip ring disposed between an upper surface of the retention recession and a retainer ring, having a plurality of teeth angled inwardly from and along a circumference of the grip ring, cooperatively engaged with the outwardly angled lower surface of the spacer ring; and the retainer ring having an inner surface cooperatively engaged with the piping element, an upper outer longitudinal surface cooperatively engaged with the retention recession, and an upper surface having a flat outer area to engage with a body of the grip ring and an upwardly angled inner area that extends towards the grip ring to engage with at least one of the plurality of teeth of the grip ring.

2. The assembly of claim 1, comprising:
the upper surface of the sealing ring to maintain a pressure that is within 10% of the pressure of a fluid in the piping element.

3. The assembly of claim 1, comprising:
the outwardly angled lower surface of the spacer ring and the upper surface of the retainer ring disposed along angles between 15° and 60° relative to the first longitudinal axis.

4. The assembly of claim 1, comprising:
a force imposed on the plurality of teeth of the grip ring by the spacer ring increases as a fluid line pressure inside the piping element increases.

5. The assembly of claim 1, comprising:
the upper surface of the retainer ring to prevent the plurality of teeth of the grip ring from inverting about the first longitudinal axis.

6. The assembly of claim 1, comprising:
an inner surface of the retention recession to facilitate coupling the retainer ring with a portion of the body.

7. The assembly of claim 1, comprising:
the upper outer longitudinal surface of the retainer ring to contact an inner surface of the retention recession.

8. The assembly of claim 1, comprising:
a plurality of pointed protrusions that extend along a portion of the sealing recession between the inlet and the outlet, the plurality of pointed protrusions to facilitate engagement with the outer surface of the spacer ring.

9. The assembly of claim 8, comprising:
a plurality of corresponding pointed projections that extend along a portion of the outer surface of the spacer ring between the inlet and the outlet, a first pointed projection of the plurality of pointed projections to engage with a portion of a first pointed protrusion of the plurality of pointed protrusions of the sealing recession.

10. The assembly of claim 1, comprising:
a pointed boss that extends from a portion of the inner surface of the spacer ring, the pointed boss to engage with a portion of a tooth of the plurality of teeth of the grip ring.

11. The assembly of claim 10, comprising:
the pointed boss to prevent rotational movement of the grip ring relative to the piping element.

* * * * *